United States Patent
Osicki

(10) Patent No.: US 8,692,156 B2
(45) Date of Patent: *Apr. 8, 2014

(54) ROBOT CELL

(75) Inventor: David E. Osicki, Painesville, OH (US)

(73) Assignee: Lincoln Global, Inc., City of Industry, CA (US)

( * ) Notice: Subject to any disclaimer, the term of this patent is extended or adjusted under 35 U.S.C. 154(b) by 468 days.

This patent is subject to a terminal disclaimer.

(21) Appl. No.: 12/562,735

(22) Filed: Sep. 18, 2009

(65) Prior Publication Data

US 2010/0072184 A1 Mar. 25, 2010

Related U.S. Application Data

(63) Continuation of application No. 11/401,039, filed on Apr. 10, 2006.

(51) Int. Cl.
*B23K 9/12* (2006.01)

(52) U.S. Cl.
USPC ........................................ 219/125.1; 219/136

(58) Field of Classification Search
USPC .............. 219/125.1, 136, 158; 228/49.2, 47.1
See application file for complete search history.

(56) References Cited

U.S. PATENT DOCUMENTS

| | | | |
|---|---|---|---|
| 2,729,578 A | 1/1956 | Hedlund et al. | |
| 4,369,958 A | 1/1983 | Maynard | |
| 4,583,257 A * | 4/1986 | Bridges et al. ................ | 15/93.1 |
| 4,958,463 A | 9/1990 | Hess et al. | |
| 5,083,070 A * | 1/1992 | Poupard et al. ............. | 318/568.1 |
| 5,873,569 A * | 2/1999 | Boyd et al. ...................... | 269/43 |
| 6,036,082 A | 3/2000 | Caldarone | |
| 6,264,418 B1 * | 7/2001 | Michael et al. ............... | 414/733 |
| 6,622,906 B1 * | 9/2003 | Kushibe ........................ | 228/212 |
| 6,772,932 B1 | 8/2004 | Halstead | |
| 7,238,916 B2 | 7/2007 | Samodell et al. | |
| 2004/0118897 A1 * | 6/2004 | Caldarone et al. ........... | 228/49.1 |

OTHER PUBLICATIONS

Non-final rejection dated Nov. 16, 2009 for U.S. Appl. No. 11/401,039.
Non-final rejection dated Feb. 27, 2009 for U.S. Appl. No. 11/401,039.

* cited by examiner

*Primary Examiner* — Henry Yuen
*Assistant Examiner* — Ayub Maye
(74) *Attorney, Agent, or Firm* — Pearne & Gordon LLP

(57) ABSTRACT

A robot cell comprises a support having a top surface within a plane and configured to rotate about a central axis substantially normal to the plane and a plurality of welding tables including a first welding table and a second welding table. The first welding table is operably connected to the support and configured to rotate about a first axis substantially parallel to the plane and about a second axis substantially normal to the plane. The first welding table is configured such that the second axis remains substantially normal to the plane while the first welding table rotates about the first axis. The second welding table is operably connected to the support and configured to rotate about a third axis substantially parallel to the plane and about a fourth axis substantially normal to the plane. The second welding table is configured such that the fourth axis remains substantially' normal to the plane while the second welding table rotates about the third axis.

17 Claims, 6 Drawing Sheets

ROBOT CELL

This application is a continuation of U.S. patent application Ser. No. 11/401,039 filed on Apr. 10, 2006, which is hereby incorporated by reference in its entirety.

BACKGROUND OF THE INVENTION

Robots have been used in welding operations for some time. An example of such is disclosed in U.S. Pat. No. 6,772,932, which is incorporated by reference. Typically, a robot arm having a welding torch at a distal end welds a work piece positioned on a work table, which can also be referred to as a welding table. The work table is located in a welding cell and the robot is programmed to weld along a desired path.

In known welding cells, work tables have limited movement with respect to the robot arm. For the robot arm to weld along the desired path, it is the robot arm that moves with respect to the work table, as opposed to the work table being able to move with respect to the robot arm. Greater flexibility with regard to the welding path could be achieved if the work table was able to move.

SUMMARY OF THE INVENTION

A robotic welding cell includes a frame, a robot arm connected to the frame, a welding gun affixed to the robot arm, a welding table connected to the welding frame, and means to move the welding table in or about at least two mutually perpendicular axes. The means to move can comprise a motor operatively connected to the welding table.

A welding table assembly for use in a robotic welding cell is also disclosed. The welding table assembly includes a welding table, a first powered drive assembly operatively connected to the welding table, and a second powered drive assembly operatively connected to the welding table. The first drive assembly rotates the welding table about a first axis. The second drive assembly rotates the welding table about a second axis.

DETAILED DESCRIPTION OF THE INVENTION

Figure 1:
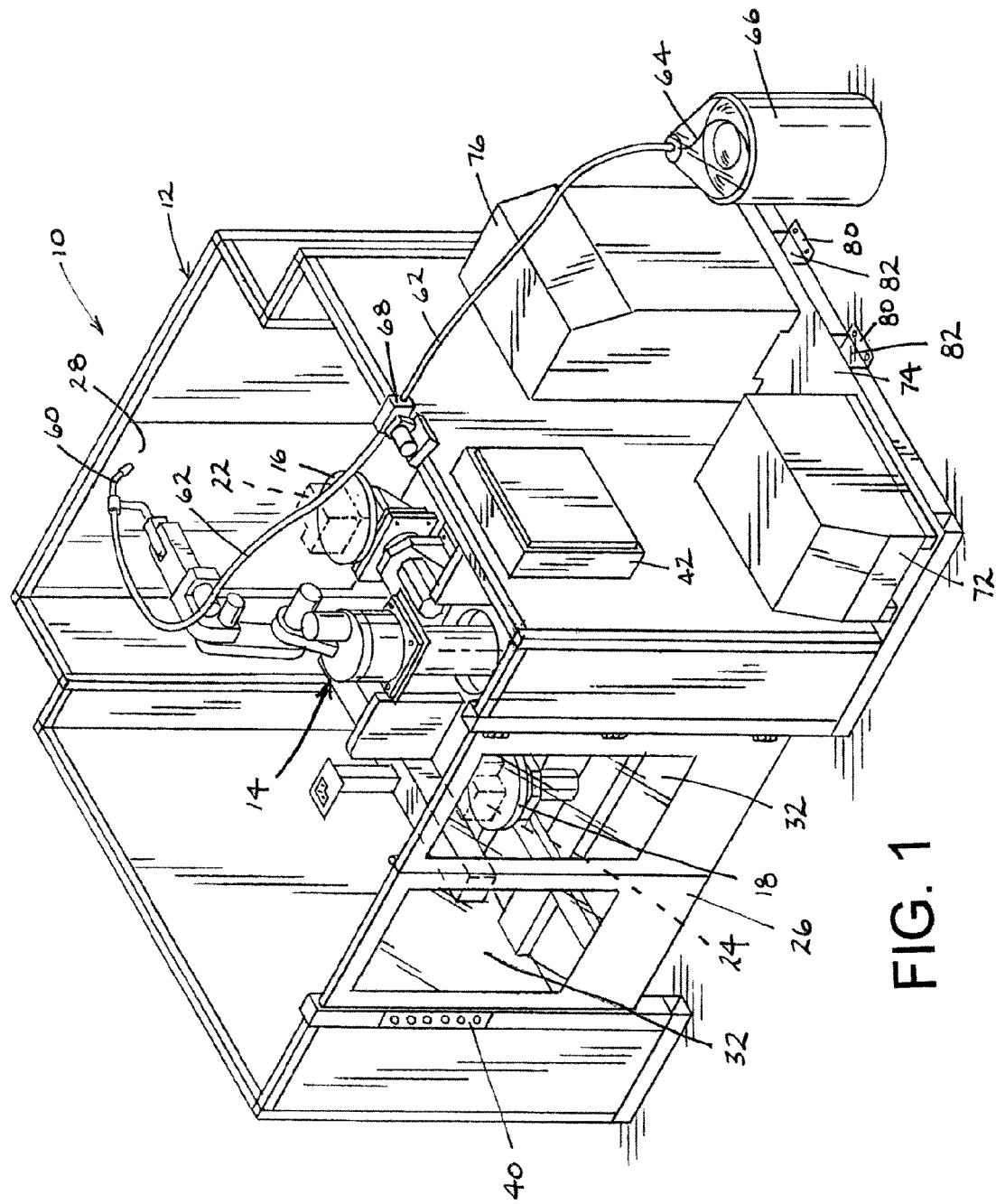
FIG. 1 is a perspective view of a welding cell unit.

With reference to FIG. 1, a welding cell unit 10 generally includes a frame 12, a robot 14 disposed within the frame, and first and second welding tables 16 and 18, respectively, also disposed of within the frame. The robot welding unit 10 is useful for welding work pieces 22 and 24 in a manner that will be described in more detail below.

In the depicted embodiment, the frame 12 includes a plurality of side walls and doors to enclose the robot 14 and the welding tables 16 and 18. Even though a substantially rectangular configuration in plan view is shown, the frame 12, and the unit 10, can take numerous configurations.

A front access door 26 mounts to the frame 12 to provide access to the interior of the frame. As more clearly seen in FIG. 2, the front access door 26 can take a bi-fold configuration where the door includes two hinge sets: a first hinge set attaching the door 26 to the frame 12 and a second hinge set attaching one panel of the door to another panel. Nevertheless, the front access door 26 can take other configurations such as a sliding door or a swinging door. Similarly, a rear access door 28 also mounts to the frame 12. The rear access door 28 in the depicted embodiment also takes a hi-fold configuration; however, the rear access door can take other configurations such as those discussed with reference to the front access door 26. Windows 32 can be provided on either door (only depicted on front door 26). The windows can include a tinted safety screen, which is known in the art.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the unit 10 in a similar manner to controls used with known welding cell units.

Figure 3:
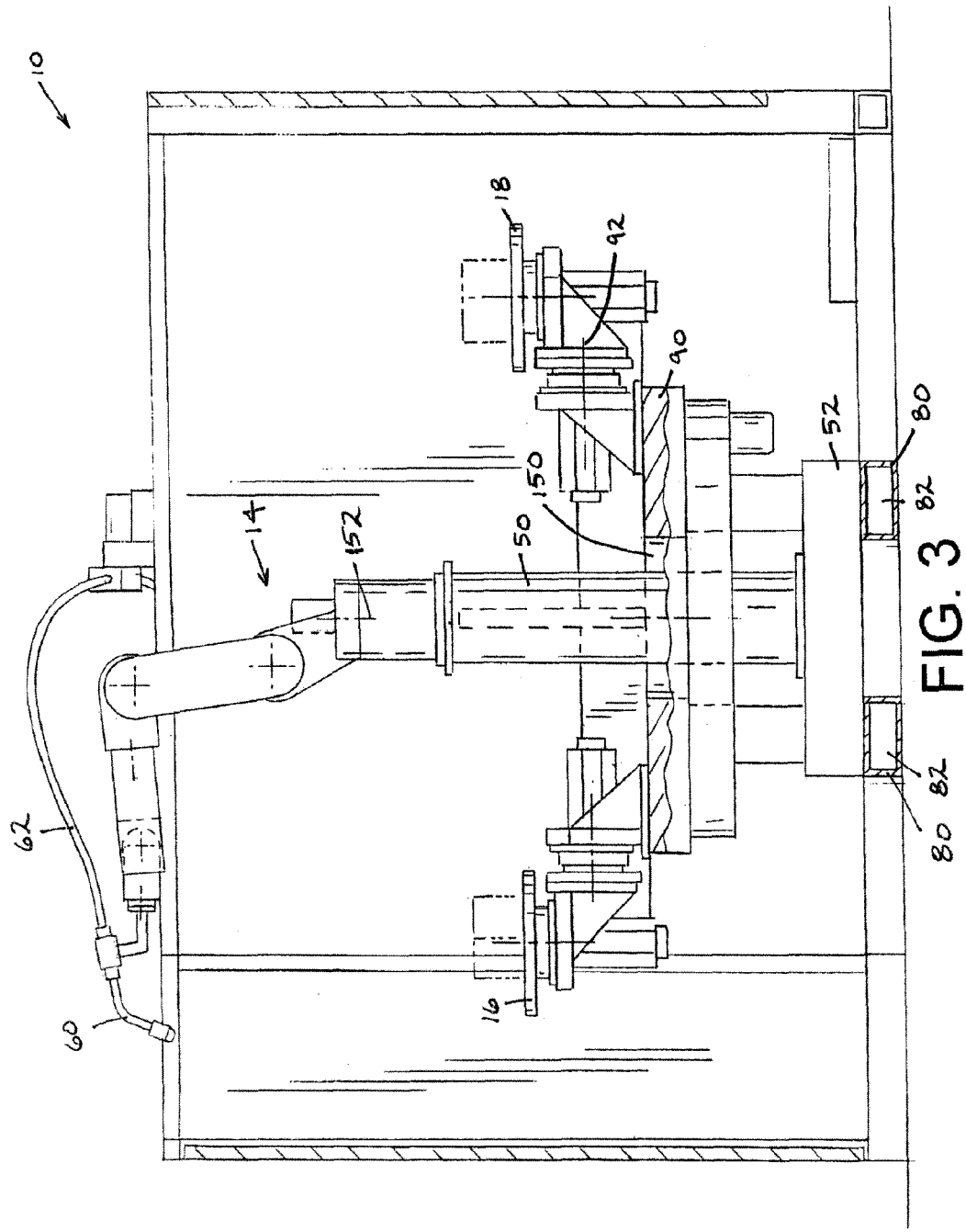
FIG. 3 is a view taken along line 3-3 of FIG. 2.

With reference to FIG. 3, the robot 14 mounts on a pedestal 50 that mounts on a support 52. The robot 14 used in the depicted embodiment can be an ARC MATE® 100iBe robot available from FANUC Robotics America, Inc. Other similar robots can also be used. The robot 14 in the depicted embodiment is centered with respect to the welding tables 16 and 18 and includes eleven axes of movement. If desired, the pedestal 50 can rotate with respect to the support 52 similar to a turret. Accordingly, some sort of drive mechanism, e.g. a motor and transmission (not shown), can be housed in the pedestal 50 and/or the support 52 for rotating the robot 14.

With continued reference to the embodiment depicted in FIG. 3, a welding gun 60 attaches to a distal end of the robot arm 14. The welding gun 60 can be similar to those that are known in the art. A flexible tube or conduit 62 attaches to the welding gun 60. As more clearly seen in FIG. 2, consumable welding electrode wire 64, which can be stored in a container 66, is delivered to the welding gun 60 through the conduit 62. A wire feeder 68, which can be a PF 10 F-11 wire feeder available from The Lincoln Electric Company, attaches to the frame 12 to facilitate the delivery of welding wire 64 to the welding gun 60.

Even though the robot 14 is shown mounted to a base or lower portion of the frame 12, if desired, the robot 14 can mount in a similar manner as the robot disclosed in U.S. Pat. No. 6,772,932. That is, the robot can mount to an upper structure of the frame and depend downwardly into the cell unit 10.

With reference back to the embodiment depicted in the figures, a power source 72 for the welding operation mounts to and rests on a platform 74 that is connected to and can be a part of the frame 12. The power source 72 in the depicted embodiment is a PW 455 M (non STT) available from The Lincoln Electric Company; however, other suitable power sources can be used for the welding operation. A robot controller 76, which controls the robot 14, also rests and mounts on the platform 74. The robot controller typically accompanies the robot 14.

Fork lift supports 80 defining fork lift receptacles 82 connect to a lower end of the frame 12. As more clearly seen in FIG. 3, the fork lift supports 80 in the depicted embodiment are centered underneath the robot support 52 and thus the robot 14 to facilitate easy movement of the welding unit 10. Even though the cell unit 10 is depicted with only two-way forklift access, the unit 10 can be easily modified to include four-way forklift access.

Figure 5:
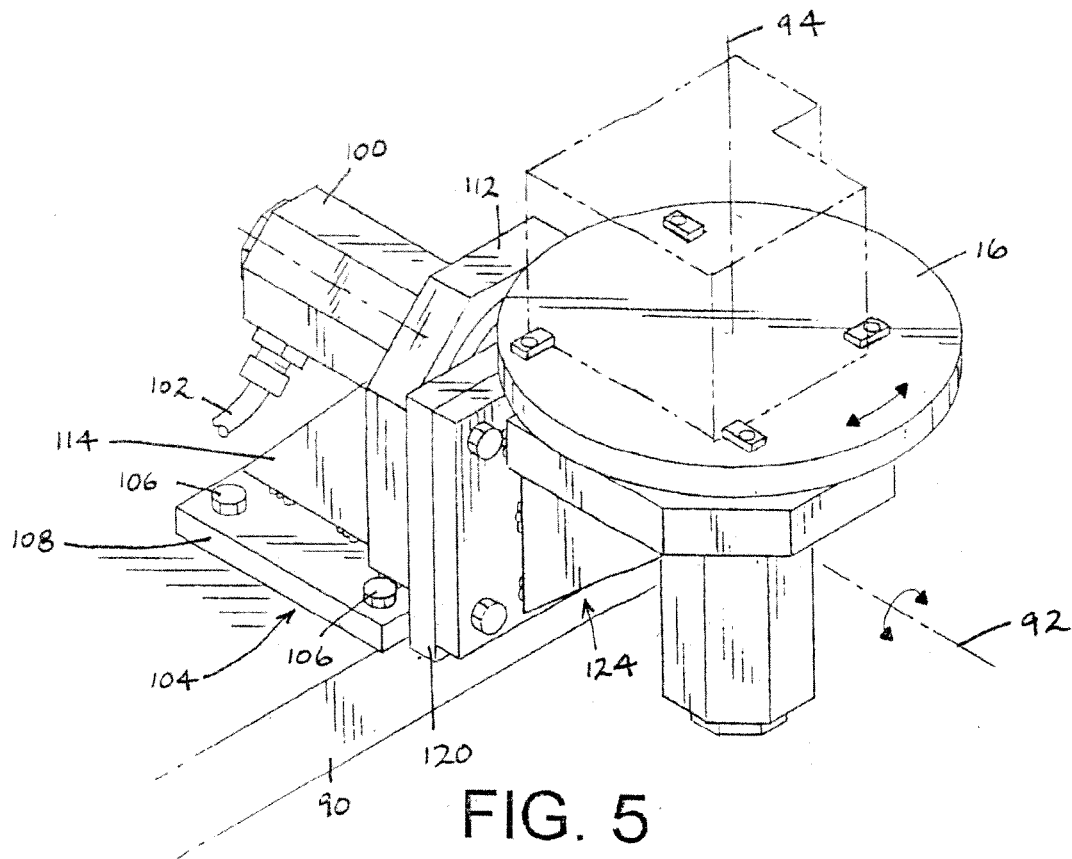
FIG. 5 is a close-up perspective view of a welding table assembly for the unit disclosed in FIG. 1.

With reference to FIG. 5, the connection between the first welding table 16 and a support 90 (also visible in FIG. 2), to which both welding tables 16 and 18 attach, will be described. The connection between the second welding table 18 and the support 90 is the same as the first welding table; therefore, for the sake of brevity only the connection between the first welding table 16 and the support 90 will be described in detail.

The welding table 16 is moveable with respect to the support 90 and with respect to the robot 14. In the embodiment depicted in FIG. 5, the welding table 16 is movable about a first axis 92 and a second axis 94, the first axis being perpendicular to the second axis. The first axis 92 is also parallel to (and in the depicted embodiment spaced above) a plane in which the support 90 resides. The second axis 94 is normal to a plane in which the welding table 16 resides. In the depicted embodiment, the second axis 94 is also spaced from an outermost edge of the support 90. The welding table 16 can move in or about these two axes via motors that will be described in more detail below. Other assemblies and devices can also be provided for moving the welding tables, including pistons for linear movement (in either axis), gearing and transmissions for both linear (e.g. along rails) and rotational movement, as well as other known devices.

Figure 6:
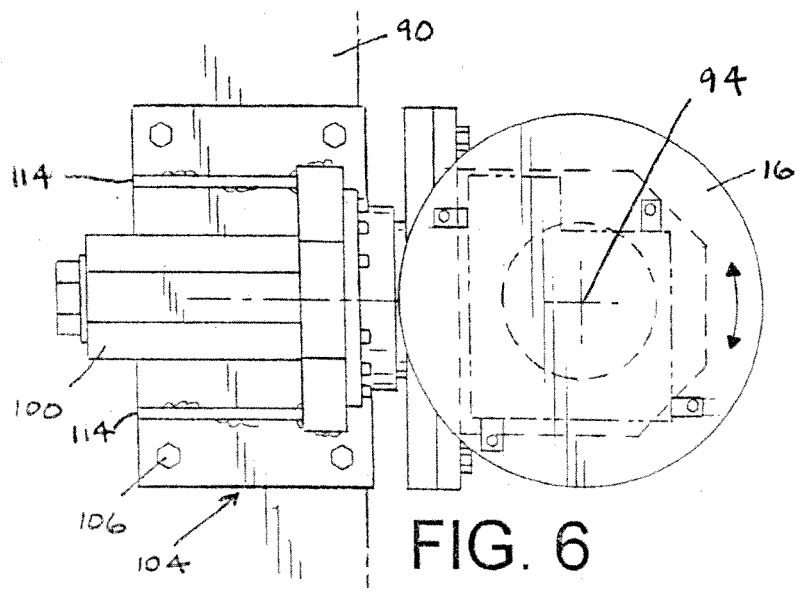
FIG. 6 is a top plan view of the assembly depicted in FIG. 5.
Figure 7:
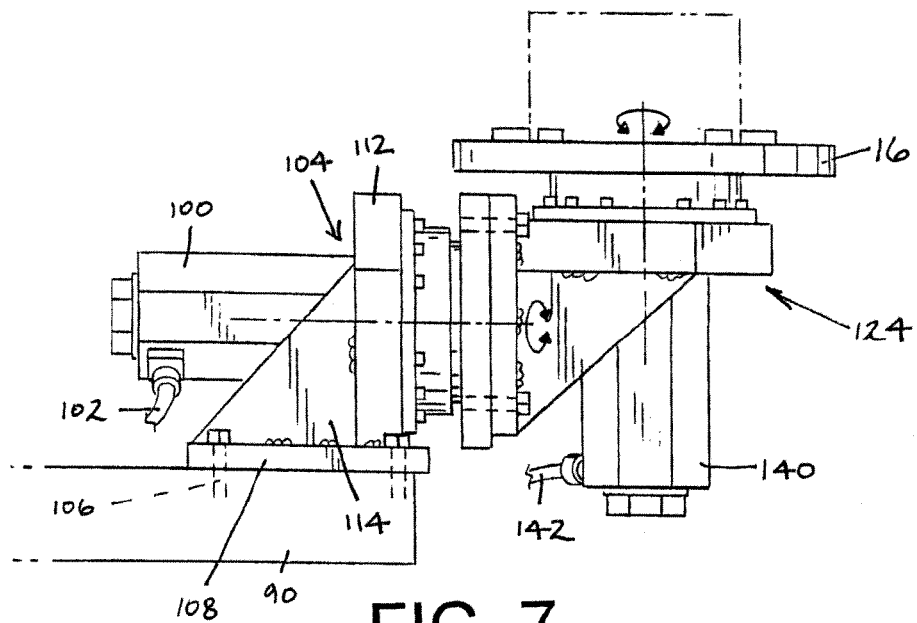
FIG. 7 is a first side elevation view of the assembly depicted in FIG. 5.
Figure 8:
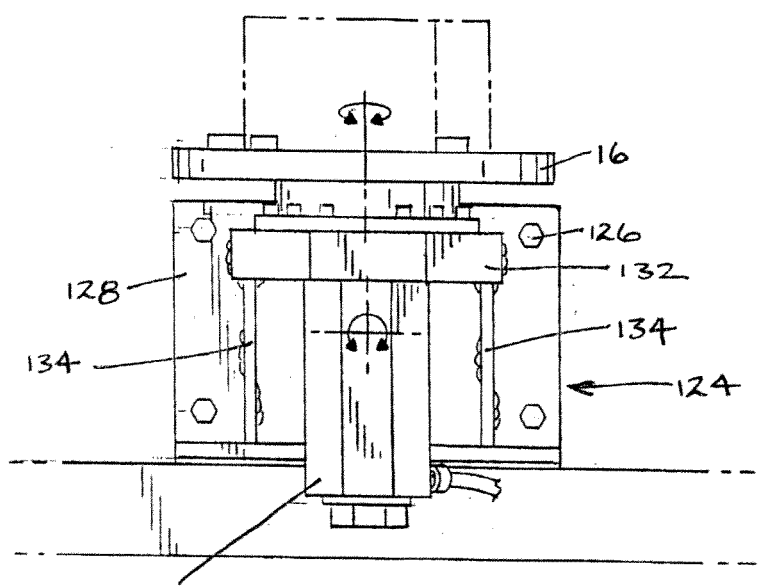
FIG. 8 is a second side elevation view of the assembly depicted in FIG. 5 taken 90° from the view show in FIG. 7.

In the embodiment depicted in FIG. 5-8, a first motor 100 is provided so that the welding table 16 can rotate about the first axis 92. The first motor 100 connects to a power supply (not shown) for the unit 10 via a power cord 102. The first motor 100 mounts to a motor mount 104 and the motor mount connects to the support 90 via bolts 106. In the depicted embodiment, the motor mount 104 includes a base portion 108 and an upright portion 112 that is disposed normally to the base portion. Web portions 114 (two are shown in FIG. 6) are spaced from one another and interconnect the base portion 108 and the support portion 112. The web portions 114 are spaced from one another an adequate distance so that the first motor 100 can be received between the base portions. The support portion 112 of the bracket 104 includes an opening to receive an output shaft (not visible) of the first motor 100. The output shaft of the first motor connects to a support plate 120 such that the support plate can rotate in or about the first axis 92.

A second motor mount 124 that has the same configuration as the first motor mount 104 connects to the support plate 120 so that it can also rotate in or about the first axis 92. As more clearly seen in FIG. 8, the second motor mount 124 attaches to the support plate 120 via bolts (or other conventional fasteners) 126. The second motor mount 124 includes a base portion 128 through which the bolts 126 extend. The second motor mount 124 also includes a support (similar to the upright portion 112 of the first motor mount 124) 132 that extends normally from the base 128. A pair of webs 134 interconnect the support 132 to the base 128. The webs 134 are spaced from one another such that a second motor 140 is receive between the webs 134. The support 132 of the motor mount 124 includes an opening through which an output shaft (not visible) of the second motor 140 is received to operatively connect the second motor 140 to the welding table 16. Power is delivered to the second motor 140 via a power cord 142 that connects to a power source (not shown) for the unit 10.

Accordingly, the welding table 16 rotates about the first axis 92 via the first motor 100 and rotates about the second axis 94 via the second motor 140. As mentioned above, the first axis 92 is parallel to and spaced above a plane in which the support 90 resides. The second axis 94 is spaced from an outer edge of the support 90 as measured along the first axis 92. Movement in the first axis 92 can be limited to prevent damage to the second motor 140 and the welding table 16. The first motor 100 is operatively connected to the welding table 16 via first motor mount 104 and the second motor mount 124.

As more clearly seen in FIG. 3, the first welding table 16 and the second welding table 18 are spaced from one another and aligned along first axis 92, in that they both reside the same radial distance from the first axis 92. Also, the first and second welding tables 16 and 18 each rotate about an axis that is normal to the axis in which the welding table resides. Even though only two welding tables are depicted, a fewer or greater number of welding tables can be provided.

Figure 4:
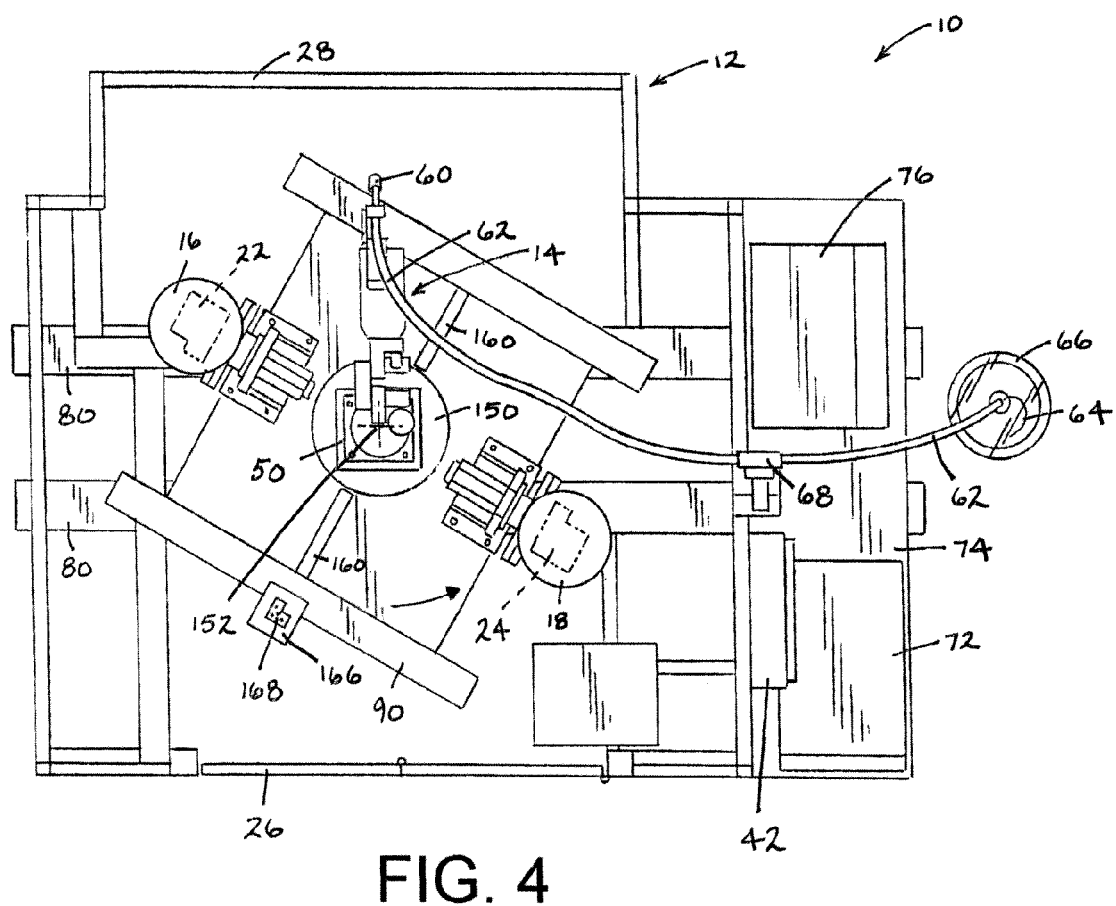
FIG. 4 is a top plan view similar to the view of FIG. 2 where a platform that is disposed in the welding cell unit has rotated from the position shown in FIG. 2.

As discussed above, the first and second welding tables 16 and 18 attach to the support 90. As more clearly seen in FIGS. 3 and 4, the support 90 includes a central opening 150 through which the pedestal 50 extends (see FIG. 3). As depicted in FIG. 4, the support 90 rotates about a central axis 152, accordingly, rotation of the support 90 also results in movement of the welding table about at least one axis, i.e. axis 152. In the depicted embodiments the welding tables 16 and 18 are spaced from one another equidistantly from the central axis 152. The robot 152 can also rotate in or about the central axis 152. A seen in FIG. 3, the support 50, which can include or connect to a turret, is also centered on the central axis 152.

Figure 2:
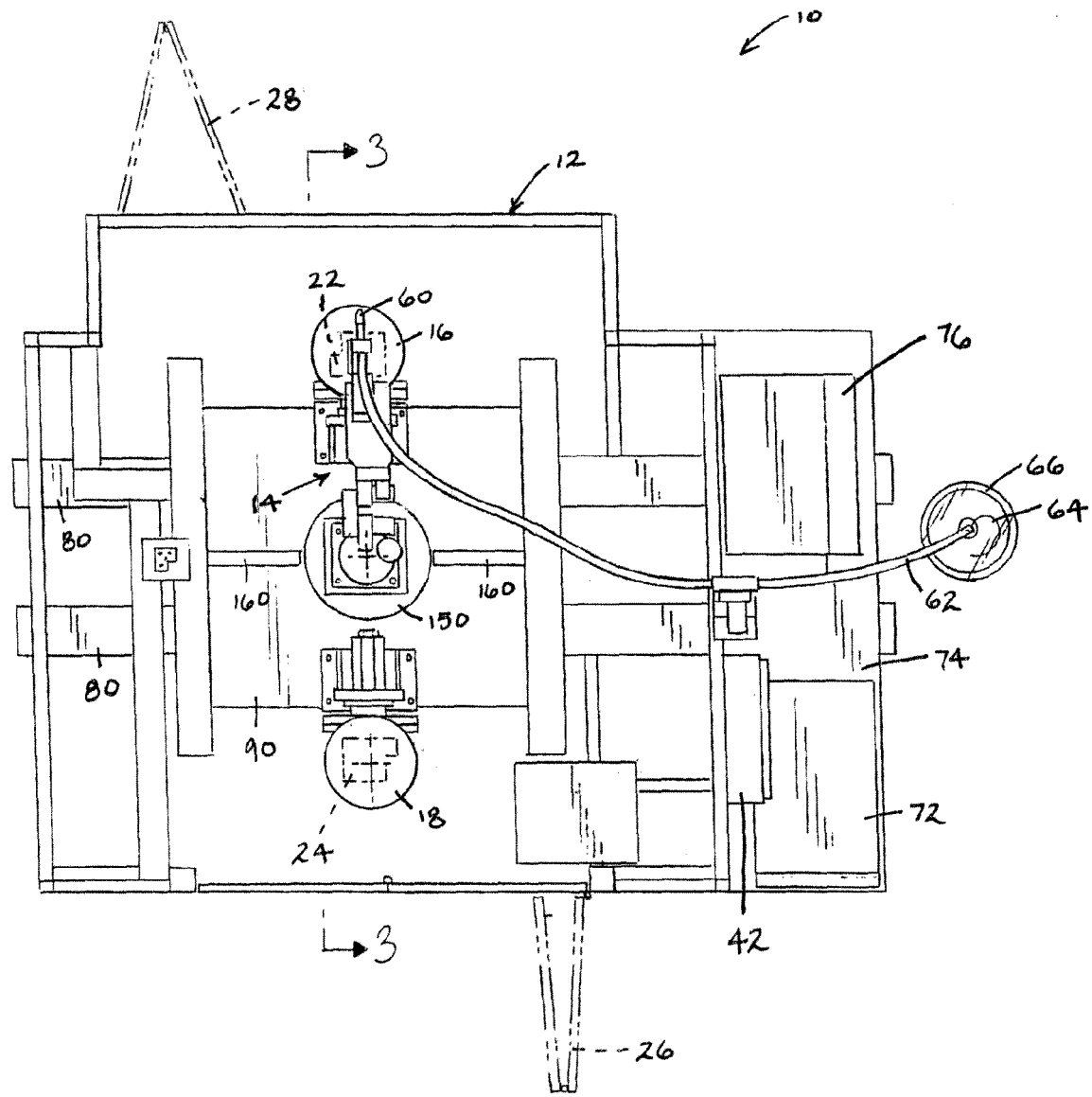
FIG. 2 is a top plan view of the welding cell unit of FIG. 1.

When the unit 10 is in use and with reference to FIG. 2, a part 24 can be loaded onto the second welding table 18 while a welding operation is being performed on the first part 22 located on the first welding table 16. In the depicted embodiment, shields 160 are provided on the support 90 between the respective welding tables on opposite sides of the robot 14. After the welding operation on the first welding table 16 has been completed, the support 90 can rotate in a manner such that the second welding table 18 now occupies the location or space that the first welding table 16 had occupied. The welding operation can then be performed on the second piece 24. The process can then be repeated.

A receptacle 168 for receiving torch conditioning devices, such as a reamer, is provided on the support 90 for cleaning of the welding gun 60 between welding procedures. A touch probe (not depicted) can also be provided on the frame and/or the support 90. The touch probes serves as a tool point reference. The touch probe can be used on a datum to allow for reprogramming of the robot. Such torch conditioning and touch probe devices are known in the art.

A welding cell unit and a welding table assembly have been described with reference to the above-mentioned embodiments and alternatives thereof. Many modifications and alterations to those embodiments disclosed readily suggest themselves to those skilled in the art upon reading and understanding the detailed description. For example, the welding table assembly can be used with other configurations of welding cell units, for example, the welding cell unit described in co-pending application Ser. No. 10/992,890, filed on Nov. 19, 2004, which is incorporated by reference herein. The invention is intended to include all such modifications and alterations insofar as they come within the scope of the appended claims and the equivalents thereof.

The invention claimed is:
1. A robotic welding assembly comprising:
a robot having a welding torch;
a robot pedestal operatively connected to the robot;

a support frame having at least one surface forming a central opening located substantially at a center of the support frame, where at least one of the robot and the robot pedestal extend through the central opening, and where the support frame is configured to rotate around the at least one of the robot and the robot pedestal about a central axis passing through the central opening;

a first welding table assembly operably connected to the support frame, the first welding table assembly including:
   a first motor configured to rotate the first welding table assembly about a first axis substantially perpendicular to the central axis and extending toward the central opening,
   a first welding table, and
   a second motor configured to rotate the first welding table about a second axis independently of the rotation of the first welding table assembly about the first axis,
      wherein the second axis is substantially perpendicular to the first axis,
      wherein the first axis remains substantially perpendicular to the central axis while the first welding table rotates about the second axis, and
      wherein the second axis remains substantially perpendicular to the first axis while the first welding table assembly rotates about the first axis; and a second welding table assembly operably connected to the support frame, the second welding table assembly including:
   a third motor configured to rotate the second welding table assembly about a third axis substantially perpendicular to the central axis and extending toward the central opening,
   a second welding table, and
   a fourth motor configured to rotate the second welding table about a fourth axis independently of the rotation of the second welding table assembly about the third axis,
      wherein the fourth axis is substantially perpendicular to the third axis,
      wherein the third axis remains substantially perpendicular to the central axis while the second welding table rotates about the fourth axis,
      wherein the fourth axis remains substantially perpendicular to the third axis while the second welding table rotates about the third axis, and
      wherein the first welding table and the second welding table are configured to rotate with the support frame around the at least one of the robot and the robot pedestal.

2. The robotic welding assembly of claim 1, where the second axis and the fourth axis are located outside an outer most edge of the support frame.

3. The robotic welding assembly of claim 1, further comprising a central motor operatively connected to the support frame and configured to cause the support frame to rotate about the central axis.

4. The robotic welding assembly of claim 1, where the first welding table and the second welding table are spaced at a same distance from the central axis.

5. The robotic welding assembly of claim 1, where the robot is configured to rotate about the central axis.

6. The robotic welding assembly of claim 1, further comprising a plurality of shields operatively connected to the support frame, where a first shield from the plurality of shields is located between the first welding table and the second welding table.

7. The robotic welding assembly of claim 1, further comprising a reamer operatively connected to the support frame.

8. The robotic welding assembly of claim 7, wherein the reamer is disposed in a receptacle attached to the support frame at a location between the first welding table assembly and the second welding table assembly.

9. A welding cell unit comprising:
   a robot having a welding torch;
   a robot pedestal operatively connected to the robot, and;
   a support having a top surface within a plane and forming a central opening, where at least one of the robot and the robot pedestal are located such that the at least one of the robot and the robot pedestal protrude through the central opening, and where the support is configured to rotate around the at least one of the robot and the robot pedestal about a central axis substantially normal to the plane and passing through the central opening; and
   a plurality of welding table assemblies including a first welding table assembly and a second welding table assembly,
      where the first welding table assembly is operably connected to the support and configured to rotate about a first axis that is substantially normal to the central axis and extends toward the central opening, where the first welding table assembly includes a first welding table configured to rotate about a second axis substantially normal to the first axis, independent of the rotation of the first welding table assembly about the first axis, where the first axis remains substantially normal to the central axis while the first welding table rotates about the second axis, and where the first welding table assembly is configured such that the second axis remains substantially normal to the first axis while the first welding table assembly rotates about the first axis,
      where the second welding table assembly is operably connected to the support and configured to rotate about a third axis that is substantially normal to the central axis and extends toward the central opening, where the second welding table assembly includes a second welding table configured to rotate about a fourth axis substantially normal to the third axis, independent of the rotation of the second welding table assembly about the third axis, where the third axis remains substantially perpendicular to the central axis while the second welding table rotates about the fourth axis, and where the second welding table assembly is configured such that the fourth axis remains substantially normal to the third axis while the second welding table assembly rotates about the third axis, and
      where the first welding table and the second welding table are configured to rotate with the support around the at least one of the robot and the robot pedestal.

10. The welding cell unit of claim 9, where the robot is configured to rotate about the central axis.

11. The welding cell unit of claim 9, where the second axis and the fourth axis are located outside an outer most edge of the support.

12. The welding cell unit of claim 9, comprising a plurality of motors including:
   a first motor operatively connected to the first welding table assembly and configured to cause the first welding table assembly to rotate about the first axis;

a second motor operatively connected to the first welding table and configured to cause the first welding table to rotate about the second axis;

a third motor operatively connected to the second welding table assembly and configured to cause the second welding table assembly to rotate about the third axis; and a fourth motor operatively connected to the second welding table and configured to cause the second welding table to rotate about the fourth axis.

13. The welding cell unit of claim 9, further comprising a central motor operatively connected to the support and configured to cause the support to rotate about the central axis.

14. The welding cell unit of claim 9, where the first welding table and the second welding table are located at a same distance from the central axis.

15. The welding cell unit of claim 9, further comprising at least two shields operatively connected to the support, where a first shield from the plurality of shields is located between the first welding table and the second welding table.

16. The welding cell unit of claim 9, further comprising a reamer operatively connected to the support.

17. A welding cell assembly comprising:
a robot having a welding torch; and
a robot pedestal operatively connected to the robot;
a first holder assembly having a first workpiece holder;
a second holder assembly having a second workpiece holder;
a support frame for rotating the first workpiece holder and the second workpiece holder around the robot pedestal about a central axis, the support frame having at least one surface forming a central opening located substantially at a center of the support frame, where the robot pedestal extends through the central opening, and where the robot pedestal is located such that distance between the robot pedestal and the first holder assembly is substantially constant while the first holder assembly rotates about the central axis;

means for rotating the first holder assembly about a first axis substantially perpendicular to the central axis and extending toward the central opening;

means for independently rotating the first workpiece holder about a second axis substantially perpendicular to the first axis, where the first axis remains substantially perpendicular to the central axis while the first workpiece holder rotates about the second axis, and where the second axis remains substantially perpendicular to the first axis when the first workpiece holder rotate about the first axis;

means for rotating the second holder assembly about a third axis substantially perpendicular to the central axis and extending toward the central opening; and means for independently rotating the second workpiece holder about a fourth axis substantially perpendicular to the third axis, where the third axis remains substantially perpendicular to the central axis while the second workpiece holder rotates about the fourth axis, and where the fourth axis remains substantially perpendicular to the third axis when the second workpiece holder rotate about the third axis.

\* \* \* \* \*